United States Patent
Yao et al.

(10) Patent No.: US 6,183,914 B1
(45) Date of Patent: Feb. 6, 2001

(54) POLYMER-BASED HYDROXIDE CONDUCTING MEMBRANES

(75) Inventors: Wayne Yao, Bergenfield, NJ (US); Tsepin Tsai, White Plains, NY (US); Yuen-Ming Chang, Elmsford, NY (US); Muguo Chen, West Harrison, NY (US)

(73) Assignee: Reveo, Inc., Elmsford, NY (US)

( * ) Notice: Under 35 U.S.C. 154(b), the term of this patent shall be extended for 0 days.

(21) Appl. No.: 09/156,135

(22) Filed: Sep. 17, 1998

(51) Int. Cl.$^7$ .............................. H01M 8/10; H01M 10/08
(52) U.S. Cl. ........................... 429/309; 429/33; 429/310; 429/315; 429/322
(58) Field of Search .............................. 429/322, 33, 309, 429/310, 315, 321

(56) References Cited

U.S. PATENT DOCUMENTS

| | | | |
|---|---|---|---|
| 3,660,170 | 5/1972 | Rampel | 136/154 |
| 4,828,941 | 5/1989 | Sterzel | 429/33 |
| 5,250,370 | 10/1993 | Faris | 429/68 |
| 5,468,574 | 11/1995 | Ehrenberg et al. | 429/33 |
| 5,643,490 | * 7/1997 | Takahashi | 252/62.2 |

FOREIGN PATENT DOCUMENTS

WO9811619    3/1998   (WO) .

OTHER PUBLICATIONS

Patent Abstracts of Japan 4(104) (Jul. 25, 1980) & JP55062661 (May 12, 1980).

Gray, Fiona M., *Solid Polymer Electrolytes: Fundamentals and Technological Applications*, VCH Publishers, Inc., New York, pp. 1–3 (1991).

Gray et al., "Novel Polymer Electrolytes Based on ABA Block Copolymers," *Macromolecules*, 21, pp. 392–397 (1988).

Mauritz, Kenneth A., "Review and Critical Analyses of Theories of Aggregation in Ionomers," *Macromol. Chem. Phys.* C28, pp. 65–98 (1988).

Yen et al., "Polymeric Electrolyte Membrane Materials for Fuel Cells," *NASA Tech Briefs*, p. 64, (Sep. 1997).

Vuorilehto et al., "Application of a solid ion–exchange electrolye in three–dimensional electrodes," *Journal of Applied Electrochemistry*, 27, pp. 749–755 (1997).

* cited by examiner

*Primary Examiner*—Stephen Kalafut
*Assistant Examiner*—Mark Ruthkosky
(74) *Attorney, Agent, or Firm*—Heslin & Rothenberg, P.C.

(57) ABSTRACT

A polymer-based electrolyte composition having excellent film-forming properties, flexibility, mechanical strength and high hydroxide conductivity is disclosed. The composition comprises an organic polymer having an alkyl quaternary ammonium salt structure; a nitrogen-containing, heterocyclic quaternary ammonium salt; and a metal hydroxide salt. In a preferred embodiment, the composition is cast in the form of a film that is suitable for use as an ion-conducting or other specialty membrane in a power source, such as for example an alkaline battery or fuel cell, that relies on hydroxide anion transport for its operation.

20 Claims, 2 Drawing Sheets

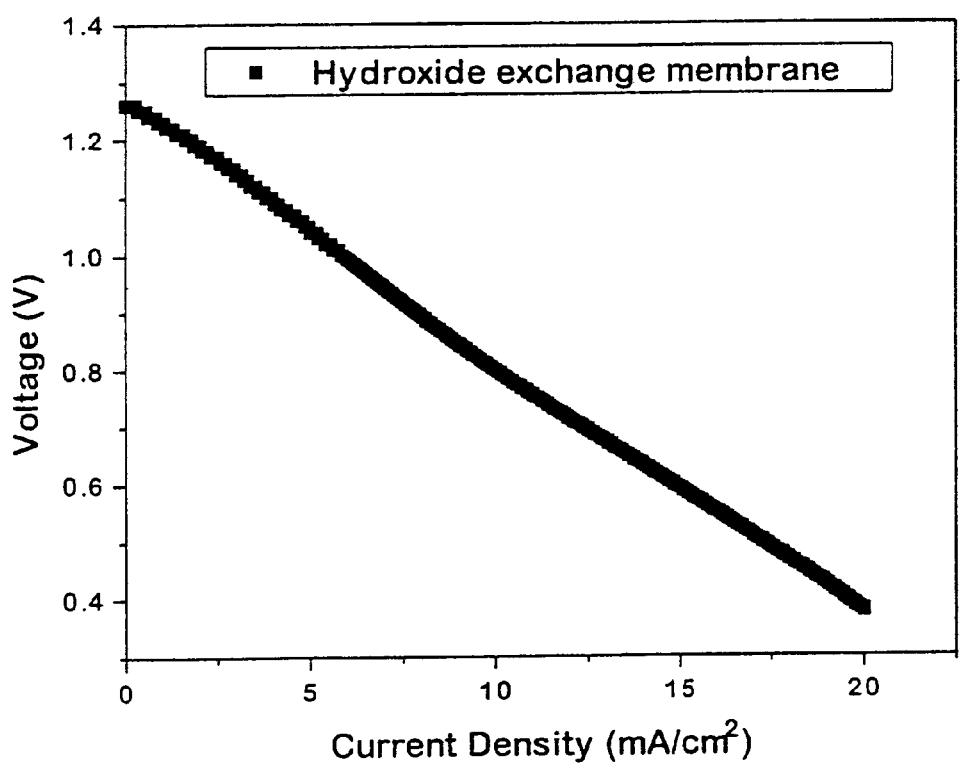

POLYMER-BASED HYDROXIDE CONDUCTING MEMBRANES

FIELD OF THE INVENTION

This invention relates generally to solid electrolyte compositions, and more particularly, to a polymer-based electrolyte composition having good film-forming properties, flexibility, mechanical strength and high hydroxide conductivity.

BACKGROUND OF THE INVENTION

A fuel cell generates electricity directly from a fuel source and an oxidant. The fuel source may be for example, alcohol, hydrogen gas, natural gas, or metal sheet, and the oxidant may be for example, oxygen or air. Because this process does not "burn" the fuel in order to produce heat, the thermodynamic limits on efficiency are much higher than for normal power generation processes. In essence, a fuel cell consists of two electrodes separated by an ion-conducting material or membrane. The ion-conducting membrane must allow the diffusion of ions from one electrode to the other and at the same time prevent the flow of electrons across the membrane and keep the fuel and oxidant components apart. If electrons are able to cross the membrane, the fuel cell will be fully or partially shorted out, and any useful power that has been produced will be eliminated or reduced. Diffusion or leakage of the fuel or oxidant across the membrane can also result in undesirable consequences.

Early fuel cells incorporated a liquid electrolyte such as for example, an acid, alkaline or salt solution, as the ion-conducting material. With advances in technology, however, interest has shifted to the development of solid electrolyte ion-conducting membranes, such as the solid proton exchange membrane, DuPont Nafion®. Solid electrolyte membranes provide several advantages over liquid electrolyte compositions. For example, a fuel cell having a solid electrolyte membrane does not contain any corrosives or solvents that might react with the seals or other portions of the fuel cell container. In addition, with solid electrolyte membranes, fuel cells may be constructed that are thin and lightweight and wherein a plurality of cells may be stacked. Electrolyte compositions have been developed that have good film-forming properties and that therefore can form membranes having good flexibility and mechanical strength and that exhibit high conductivity.

Solid electrolytes can be broadly divided into two groups—organic and inorganic. Organic solid electrolytes, while typically exhibiting lower ionic conductivity, provide good mechanical properties and flexibility and are able to form thin films. Inorganic solid electrolytes on the other hand, while generally having relatively high ionic conductivity, exhibit poor mechanical strength due to their crystalline nature.

Over the past two decades, a wide variety of solid electrolyte compositions have been investigated for use in electrochemical devices such as fuel cells and batteries. In 1973, for example, Dr. P. V. Wright reported a class of solid electrolytes for use in a lithium ion battery. The electrolyte material comprises a polymer such as poly(ethylene oxide), $(-CH_2CH_2O-)_n$, or "PEO", and a lithium salt.

Gray et al., "Novel Polymer Electrolytes Based on ABA Block Copolymers," *Macromolecules*, 21:392–397(1988) discloses a styrene-butadiene-styrene block copolymer wherein the ion-conducting entity is a pendant short-chain PEO monomethyl ether complex with $LiCF_3SO_3$ salt which is connected through a succinate linkage to a flexible connecting entity which is the butadiene block of the triblock copolymer.

U.S. Pat. No. 4,828,941 to Stenzel discloses an anion exchanger solid electrolyte polymer-based membrane for use in a methanol/air fuel cell.

U.S. Pat. No. 5,643,490 to Takahashi et al discloses a polymer solid electrolyte composition that is comprised of an organic polymer having an alkyl quaternary ammonium salt structure and a cold-melting salt. The salt component is the reaction product of a nitrogen-containing heterocyclic quaternary ammonium salt and a metal salt, preferably an aluminum halide.

Other polymer-based solid electrolyte materials include composites of PEO and alkali metal salts, such as for example, Na salt; acrylic or methacrylic, organic high polymers having a PEO structure at its side chain; polyphosphazenic, organic polymers having PEO structures as its side chains and ($-P=N-$) as its main chain; and siloxanic, organic polymers having a PEO structure at its side chain and ($-SiO-$) as its main chain. Such polymer-based materials however, while having high ionic conductivity, typically function only at extremely high temperatures (100° C. or higher) and are therefore inappropriate for use in ordinary fuel cells and batteries that are generally used at room temperature. In addition, the flexibility and film-forming properties of these materials are typically less than desirable.

With the recent development of $H_2/O_2$ fuel cell technology, attention has been focused on the development of proton transport/exchange membranes. In the early 1970's, for example, for reasons of chemical stability, DuPont introduced a fully fluorinated polymer membrane, Nafion®, which has since served as the basis from which subsequent proton exchange membrane fuel cells have traditionally been constructed. Nafion® belongs to a wide class of solid superacid catalysts exhibiting acid strength greater than that of 100 percent $H_2SO_4$. The composition includes both hydrophobic ($-CF_2-CF_2-$) and hydrophilic ($-SO_3H$) regions in its polymer backbone and the strong acidic features of the composition are the result of the electron-withdrawing effect of the perfluorocarbon chain on the sulfonic acid group. Nafion® however, is very expensive to produce, thus raising the cost of fuel cells to a level that renders them commercially unattractive. As a result, attention has therefore been focused upon the development of a less expensive proton-conducting material.

U.S. Pat. No. 5,468,574 to Ehrenberg et al. discloses a proton-conducting membrane comprised of a plurality of acid-stable polymer molecules each having at least one ion-conducting component covalently bonded to at least one flexible connecting component. The membrane is characterized as a highly sulfonated polymeric membrane composed of block copolymers of sulfonated polystyrene, ethylene and butylene blocks.

In 1997, NASA's Jet Propulsion Laboratory disclosed the development of an improved proton-conducting membrane for use in both $H_2/O_2$ and direct methanol fuel cells. The membrane material is composed of highly sulfonated poly (ether ether ketone), commonly known as H-SPEEK. In comparison with previous fuel cell membrane materials, H-SPEEK is claimed to be more stable in the optimum range of operating temperatures (100 to 200° C.), to be less permeable by methanol, and to be much less expensive to produce. See, "Polymeric Electrolyte Membrane Materials for Fuel Cells," *NASA Tech Briefs*, p. 64, September 1997.

As attention continues to be focused on the development of less expensive proton-conducting fuel cell membranes, the present inventors have discovered the importance of another type of ion-conducting membrane—one that transports hydroxide ion. The transport of hydroxide ion is considered to be the basis for the operation of power sources as alkaline batteries and fuel cells. Accordingly, the present inventors have recognized that in order to apply the many advantages of solid electrolyte membranes to alkaline power sources, it is necessary to provide a hydroxide-conducting composition having good film-forming properties, including flexibility and mechanical strength. A film formed of the material must allow the diffusion of hydroxide anion and a the same time prevent the flow of electrons and the diffusion of molecular gases. Previously known electrolyte compositions such as alkali metal ion-exchange and proton-exchange materials do not satisfy these criteria and therefore, cannot function as a hydroxide conducting solid electrolyte membrane.

Prior to the present invention, aqueous alkaline solutions, such as potassium hydroxide and sodium hydroxide, were utilized as the liquid electrolyte in alkaline batteries and fuel cells. The function of the electrolyte solution is to provide the hydroxide anion responsible for conducting ion transport from one electrode to the other in the operation of the electrochemical cell. Recognizing the value of solid electrolyte membranes, the present inventors have discovered a polymer-based electrolyte composition that may be cast in the form of a film and substituted for the liquid electrolyte solution in an alkaline battery or fuel cell.

In order to function as a solid electrolyte membrane in an alkaline battery or fuel cell, a material should contain high-density hydroxide carrier ions; it should have functional groups capable of adequately interacting with the hydroxide ion carrier ions; it should maintain its amorphous state even at low temperatures (e.g. room temperature); and it should be free of electronic conduction. The polymer-based electrolyte composition of the present invention satisfies each of these requirements.

SUMMARY OF THE INVENTION

The present invention provides a polymer-based electrolyte composition comprised of an organic polymer backbone having an alkyl quaternary ammonium cation unit; a nitrogen-containing, heterocyclic ammonium salt; and a hydroxide anion that is free from shifting from one site to another. More particularly, the composition comprises (a) an organic polymer having an alkyl quaternary ammonium salt structure; (b) a nitrogen-containing, heterocyclic quaternary ammonium salt; and (c) a metal hydroxide salt, preferably aluminum hydroxide.

In one embodiment, the polymer-based electrolyte composition of the present invention may be cast in the form of a film. Due to the high hydroxide conductivity of the composition, the film is suitable for use as a solid electrolyte membrane, such as that in a fuel cell. More particularly, the film is suitable for use as a hydroxide conducting membrane in an alkaline battery or fuel cell.

The organic polymer having an alkyl quaternary salt structure component of the composition is preferably chosen from compounds of formula A and formula C, below.

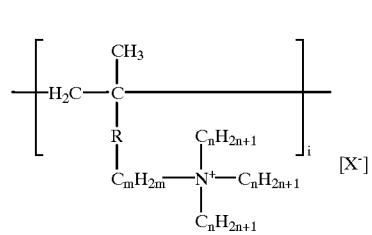

wherein
R is chosen from a direct bond, —C(O)O— and —C(O)NH—;
m is an integer of from 1 to 3;
n is an integer of from 1 to 4; and
$X^-$ is a counter anion, preferably chosen from $Cl^-$, $Br^-$ and $I^-$.

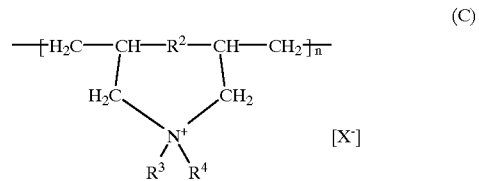

wherein
$R^2$ is chosen from a direct bond and $CH_2$;
$R^3$ and $R^4$ are each a lower alkyl group;
n is an integer; and
$X^-$ is a counter anion, preferably chosen from $Cl^-$, $Br^-$ and $I^-$.

The nitrogen-containing heterocyclic quaternary ammonium salt is preferably chosen from alkylimidazolium salts and alkylpyridinium salts. More preferably, the alkylpyridiniumn salts are methyl and butylpyridinium salts, such as butylpyridinium iodide.

In another embodiment of the invention, the composition further includes a binder, which functions to increase the mechanical strength of a film prepared from the composition.

The principles of the present invention also provide a method for producing a polymer solid electrolyte film. The method comprises the steps of (a) dissolving an organic polymer having an alkyl quaternary ammonium salt structure, a nitrogen-containing, heterocyclic ammonium salt and a metal hydroxide salt in an organic solvent to obtain a solution, and (b) casting the resulting solution to produce a solid film. The organic solvent is preferably chosen from water, nitromethane or a lower alcohol.

In one embodiment of the method, step (a) is further characterized in that the solution further includes a binder, and in another embodiment, step (b) is further characterized in that the solution of step (a) is cast into polyester mesh. The resulting films obtained in accordance with these embodiments of the invention have increased tensile strength.

Numerous other advantages and features of the present invention will become readily apparent from the following detailed description of the preferred embodiment, the accompanying drawings and the appended claims.

BRIEF DESCRIPTION OF THE DRAWINGS

FIG. 3 is a graphic representation of the voltage/current density curve obtained for the cell obtained in Example 3.

DETAILED DESCRIPTION OF THE PREFERRED EMBODIMENT

Figure 1:
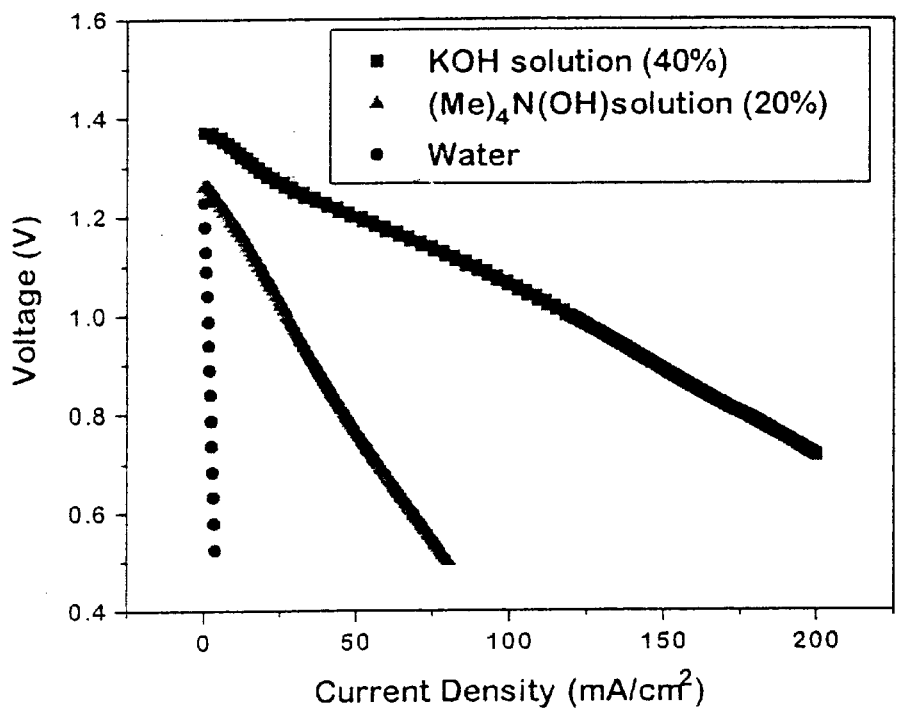
FIG. 1 is a graphic representation of the voltage/current density curve achieved with various aqueous electrolyte solutions.

Although this invention is susceptible to embodiment in many different forms, preferred embodiments of the invention are shown. It should be understood, however, that the present disclosure is to be considered as a exemplification of the principles of this invention and is not intended to limit the invention to the embodiments illustrated.

In one embodiment, the present invention provides a polymer-based electrolyte composition comprised of (a) an organic polymer having an alkyl quaternary ammonium salt structure; (b) a nitrogen-containing, heterocyclic ammonium salt; and (c) a source of hydroxide anion. In a preferred embodiment, the composition is in the form of a film suitable for use as an ion-conducting solid electrolyte membrane. The membrane may be used in power sources, such as for example, fuel cells. More particularly, the film is suitable for use as a hydroxide conducting solid electrolyte membrane in an alkaline battery or fuel cell.

As a first constitutive component, the composition of the present invention includes an organic polymer having an alkyl quaternary ammonium salt structure. While the specific structure of the organic polymer backbone is not defined by the present invention, preferred polymer structures are those having alkyl quaternary ammonium groups at the ends of the polymer side chains, exemplified by formula A, below.

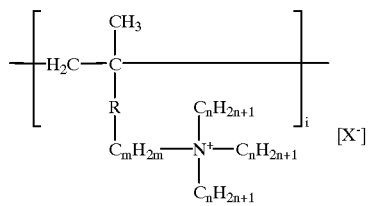

(A)

wherein

R is chosen from a direct bond, —C(O)O— and —C(O)NH—;

m is an integer of from 1 to 3;

n is an integer of from 1 to 4; and $X^-$ is a counter anion, preferably chosen from $Cl^-$, $Br^-$ and $I^-$.

Organic polymers of formula A may be obtained, for example, as homopolymers from vinyl monomers including the alkyl quaternary ammonium salt structure, or as copolymers from these vinyl monomers and other vinyl comonomers. Formula B exemplifies the copolymers that may be obtained from such a vinyl monomer and a vinyl comonomers.

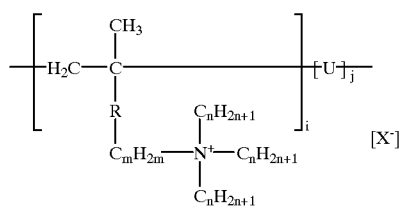

(B)

wherein:

U is a polymer constitutive unit from the copolymerized vinyl comonomer;

R is chosen from a direct bond, —C(O)O— and —C(O)NH—;

m is an integer from 1 to 3;

n is an integer from 1 to 4; and $X^-$ is a counter anion, preferably chosen from $Cl^-$, $Br^-$ and $I^-$.

Preferably, the vinyl comonomers that provide polymer constitutive unit U, will be those having vinylic unsaturated hydrocarbons. Examples of such vinyl comonomers include, but are not limited to, acrylic monomers, such as, for example, $CH_2=CHCOOH$ and $CH_2=CHCOOR$, wherein R is an alkyl group; methacrylic monomers, such as, for example, $CH_2=CCH_3COOH$ and $CH_2=CCH_3COOR$, wherein R is an alkyl group; $CH_2=[COO(CH_2CH_2O)_nCH_3]_2$, wherein n is an integer from 1 to 23; $CH_2=CH(C_6H_5)$; $CH_2=CHCN$; $CH_2=CHCONH_2$; vinyl chloride, vinyl pyrrolidone, and the like. The copolymers may be obtained from the copolymerization of one or more of these vinyl comonomers by any known process, such as for example, a radical polymerization process, photopolymerization, or the like.

In addition to organic polymers of formula A, the organic polymer component of the composition of the present invention may also comprise monomer units wherein an alkyl quaternary ammonium salt structure is bonded to the main chain of the polymer to form a cyclic structure therein, exemplified by formula C, below.

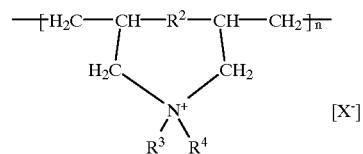

(C)

wherein $R^2$ is chosen from a direct bond and $CH_2$;

$R^3$ and $R^4$ are each a lower alkyl group;

n is an integer; and $X^-$ is a counter anion, preferably chosen from $Cl^-$, $Br^-$ and $I^-$.

Organic polymers of formula C may be obtained, for example, by polymerization of diallyl dialkyl ammonium halide monomers, as well from other commercial sources. Poly(diallyl-dimethyl-ammonium) chloride, for example, may be derived from diallyl-dimethyl-ammonium chloride monomer units. In a preferred embodiment of the invention, organic polymers of formula C will have a mean molecular weight of from 20,000 to 500,000.

As a second constitutive component, the polymer-based electrolyte composition of the present invention includes a nitrogen-containing, heterocyclic quaternary ammonium salt. Preferably, this component is an alkylimidazolium salt or an alkylpyridinium salt, and more preferably, methyl or butyl pyridinium salt. In a preferred embodiment, the counter anion of the salt is chosen from halides such as $Cl^-$, $Br^-$ and $I^-$.

As a third constitutive component, the polymer-based electrolyte composition of the present invention includes a source of hydroxide anion. Preferably, the source of hydroxide anion is a hydroxide salt, more preferably is a metal hydroxide salt, and most preferably, is aluminum hydroxide.

Without being limited to any particular theory, it is considered that, in the polymer-based electrolyte composition of the present invention, the hydroxide component forms a complex with the counter anion of either the alkyl quaternary ammonium salt of the organic polymer or the nitrogen-containing, heterocyclic quaternary ammonium compound. It is further considered that complexes of both a quasi-tetrahedral structure and a dimeric quasi-tetrahedral structure with one common counter ion therein are formed, depending on the ratio of the three constitutive components. For example, when the hydroxide component is aluminum hydroxide, both $[AlX(OH)_3]^-$ and $[Al_2X(OH)_6]^-$ may be formed.

The preferred ratio of the organic polymer, the nitrogen-containing, heterocyclic quaternary ammonium salt, and the metal hydroxide salt varies, depending on the type of organic polymer and ammonium salt utilized. Generally, it is preferred that for one mole of organic polymer, the amount of the nitrogen-containing, heterocyclic ammonium salt ranges from 0.2 to 0.6 moles, and the amount of the hydroxide component ranges from 0.3 to 0.5 moles.

The polymer-based electrolyte composition of the present invention may be produced by any ordinary method, such as for example, by uniformly dissolving the three constitutive components in an appropriate solvent. The composition will typically be utilized as a film, which may be formed by any ordinary method, such as for example, by casting. Here, the three components are dissolved in a solvent, such as for example, water, nitromethane or a lower alcohol, whereby the resulting solution is then spread over a flat substrate whereupon the solvent is evaporated out and a film obtained.

As a means to increase the mechanical strength of a film prepared in accordance with the principles of the present invention, the composition may further include a binder, such as for example, an acrylic, polyethylene, or the like. The binder may be uniformly dissolved along with the other components during preparation of the initial composition. The modified membrane exhibits the same order of conductivity as the three component membrane, along with an increased tensile strength.

In yet another embodiment of the present invention, mechanical strength of the resulting membrane may be increased by casting the composition into for example, a polyester mesh.

A polymer-based electrolyte membrane formed of a composition prepared in accordance with the principles of the present invention, may be characterized by a plurality of polymer molecules, each having at least one hydroxide-conducting component covalently bonded to at least one flexible, rubbery connecting component. The hydroxide conducting components are ordered such that a plurality of continuous hydroxide-conducting channels penetrate the membrane from a first face to a second face and such that the channels are situated in an elastic matrix formed by the flexible connecting component. In a preferred embodiment, the hydroxide-conducting channels have a cross-sectional dimension, in the plane of the membrane, of about 0.1 mm.

In accordance with the principles of the present invention, a solid electrolyte membrane having the above structure may function as a solid electrolyte membrane in a zinc air cell, such as that described in U.S. Pat. No. 5,250,370 to Faris et al. The membrane provides hydroxide anion, which functions to transport electrons from the cathode to the anode to create a flow of current in the cell.

Preferred embodiments of the present invention are hereinafter described in more detail by means of the following examples that are provided by way of illustration and not by way of limitation.

EXAMPLES

Example 1

In the early investigation of materials capable of functioning as a hydroxide-conducting material in an alkaline battery or fuel cell, the present inventors conceived of replacing the sodium or potassium hydroxide electrolyte solution with a tetraalkylammonium hydroxide solution. Tetraalkylammonium hydroxide was chosen for two reasons—it provided the hydroxide anion necessary for the operation of the electrochemical cell, and it could be immobilized as a side chain on a polymer main chain. Subsequent preliminary studies established that both aqueous tetramethyl ammonia hydroxide solution and aqueous tetraethyl ammonia hydroxide solution can function as the electrolyte in a zinc air electrochemical cell.

FIG. 1 is a graphic representation of the voltage/current density curves achieved for zinc air cells utilizing a 40% potassium hydroxide solution or a 20% tetramethyl ammonia hydroxide solution as electrolyte. While the cell comprising tetramethyl ammonia hydroxide solution exhibited lower voltage at a given current density (an unsurprising result as it does not provide as high a concentration of hydroxide anion as does potassium hydroxide), the study strongly indicated that the hydroxide anion species derived from tetramethyl ammonia hydroxide solution can function as the charge transporting ion between electrodes in the operation of an alkaline battery or fuel cell. Similar testing established that aqueous tetraethyl ammonia hydroxide solution may also function as the transport ion.

Example 2

In another preliminary study model, the hydroxide anion—conductivity of Amberlite (OH)™ (Rohm and Haas Co., Philadelphia, Pa.) suspended in deionized water was measured as the weight percentage of Amberlite (OH)™ was increased. Amberlite (OH)™ is an organic polymer having an alkyl quaternary ammonium salt structure and a hydroxide salt at its side chain.

Figure 2:
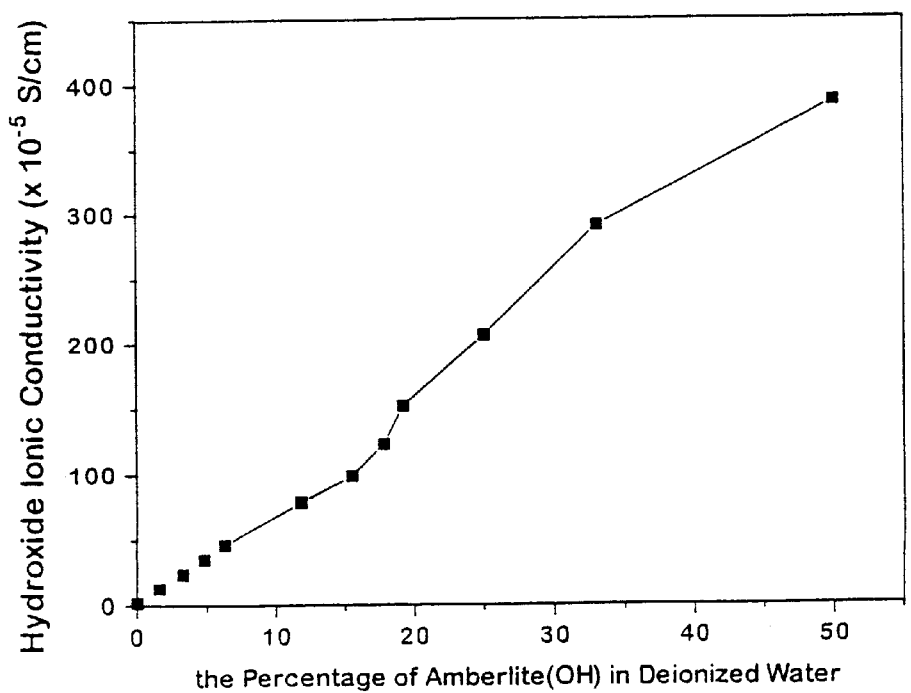
FIG. 2 is a graphic representation of the hydroxide conductivity of various aqueous solutions of Amberlite (OH)™.

FIG. 2 is a graphic representation of the results of the study which reveal that as the percentage of Amberlite (OH)™ in deionized water increased, the ionic conductivity (attributed to the $OH^-$ species) increased rapidly. At 50% Amberlite(OH)™ concentration, hydroxide anion conductivity of the solution was in the order of $10^{-3}$ S/cm. This model study strongly indicated that an organic polymer having an alkyl quaternary ammonium salt structure at its side chain provides distinct $OH^-$ conductivity. Moreover, because the Amberlite(OH)™ polymer was suspended in water, the ionic conductivity also reflected the $OH^-$ transport from solid phase to aqueous phase, another requirement placed upon a solid electrolyte membrane.

Example 3

In accordance with the principles of the present invention, a polymer-based electrolyte composition was formed by mixing (a) an organic polymer having a quaternary alkyl ammonium salt structure, poly(diallyl-dimethyl-ammonium) chloride (Aldrich Chemical Co., Inc., Milwaukee, Wis.); (b) a nitrogen-containing, heterocyclic ammonium salt, butylpyridinium iodide; and (c) a source of hydroxide anion, aluminium hydroxide, together in an appropriate solvent. After mixing, the solvent was removed to obtain a solid-like off-white mixture which was then cast into a thin off-white membrane having a thickness of 0.2 mm.

The ionic conductivity of the polymer-based solid electrolyte film obtained in Example 3 was measured in the following manner. A zinc air cell incorporating a 5 cm×5 cm sheet of the polymer solid electrolyte membrane was constructed wherein the membrane was sandwiched between a zinc sheet (anode) and an air diffusion cathode. The electrochemical cell was maintained at room temperature and controlled moisture to ensure the close contact between the electrodes and the membrane. The semi-circular portion of the cell was obtained according to a constant-voltage, complex impedance method, whereby the conductivity of the cell was then analytically calculated on the basis of the semi-circular portion. The conductivity of the membrane was determined to be about the order of $10^{-3}$ S/cm.

FIG. 3 is a graphic representation of the voltage/current density curve obtained for the cell obtained in Example 3. As can be seen from the graph, at the current density of 10 mA/cm$^2$, the voltage obtained is 0.8 V.

This invention has been described in terms of specific embodiments, set forth in detail. It should be understood, however, that these embodiments are presented by way of illustration only, and that the invention is not necessarily limited thereto. Modifications and variations within the spirit and scope of the claims that follow will be readily apparent from this disclosure, as those skilled in the art will appreciate.

We claim:

1. A polymer-based electrolyte composition comprised of:
   an organic polymer having an alkyl quaternary ammonium salt structure;
   a nitrogen-containing, heterocyclic quaternary ammonium salt; and
   a metal hydroxide salt.

2. A polymer-based electrolyte composition according to claim 1 wherein the organic polymer having an alkyl quaternary ammonium salt structure is of formula A

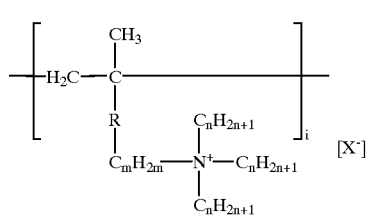

(A)

wherein
R is chosen from a direct bond, —C(O)O— and —C(O)NH—;
m is an integer of from 1 to 3;
n is an integer of from 1 to 4;
X$^-$ is a counter anion; and
i is an integer greater than 4.

3. A polymer-based electrolyte composition according to claim 2 wherein X$^-$ is chosen from Cl$^-$, Br$^-$ and I$^-$.

4. A polymer-based electrolyte composition according to claim 1 wherein the organic polymer having an alkyl quaternary ammonium salt structure is of formula C

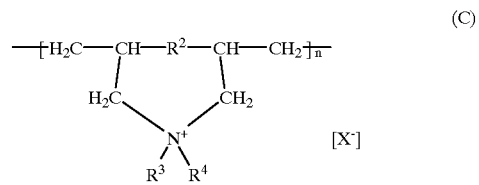

(C)

wherein
R$^2$ is chosen from a direct bond and CH$_2$;
R$^3$ and R$^4$ are each a lower alkyl group;
n is an integer; and
X$^-$ is a counter anion.

5. A polymer-based electrolyte composition according to claim 4 wherein X$^-$ is chosen from Cl$^-$, Br$^-$ and I$^-$.

6. A polymer-based electrolyte composition according to claim 1 wherein the nitrogen-containing, heterocyclic quaternary ammonium salt is chosen from alkylimidazolium salts and alkylpyridinium salts.

7. A polymer-based electrolyte composition according to claim 6 wherein the alkylpyridinium salt is chosen from methyl and butyl pyridinium salts.

8. A polymer-based electrolyte composition according to claim 7 wherein the butyl pyridinium salt is butylpyridinium iodide.

9. A polymer-based electrolyte composition according to claim 1 wherein the metal hydroxide salt is aluminum hydroxide.

10. A polymer-based electrolyte composition according to claim 1 comprising poly(diallyl-dimethyl-ammonium) chloride, butylpyridinium iodide and aluminum hydroxide.

11. A polymer-based electrolyte composition according to claim 1 further comprising a binder.

12. A polymer-based electrolyte composition according to claim 1 wherein for each mole of the organic polymer component, the composition includes 0.2 to 0.6 moles of the nitrogen-containing, heterocyclic ammonium salt component and 0.3 to 0.5 moles of the hydroxide component.

13. A method for producing a polymer solid electrolyte film comprising the steps of:
   (a) dissolving an organic polymer having an alkyl quaternary ammonium salt structure, a nitrogen-containing, heterocyclic ammonium salt and a metal hydroxide salt in an organic solvent to obtain a solution; and
   (b) casting the resulting solution to produce a polymer solid electrolyte film.

14. A method according to claim 13 wherein the organic solvent is chosen from water, nitromethane and an alcohol.

15. A method according to claim 13 wherein the solution of step (a) further includes a binder dissolved therein.

16. A method according to claim 13 wherein step (b) is further characterized in that the resulting solution is cast into a polyester mesh.

17. A method according to claim 13 wherein step (a) comprises dissolving poly(diallyl-dimethyl-ammonium) chloride, butylpyridinium iodide and aluminum hydroxide in an organic solvent.

18. A method for producing a polymer solid electrolyte film comprising the steps of:
   (a) dissolving poly(diallyl-dimethyl-ammonium) chloride, butylpyridinium iodide and aluminum hydroxide in an organic solvent to obtain a solution; and (b) casting the resulting solution to produce a polymer solid electrolyte film.

19. A polymer-based electrolyte composition according to claim 1, wherein the organic polymer having an alkyl quaternary ammonium salt structure is of formula B

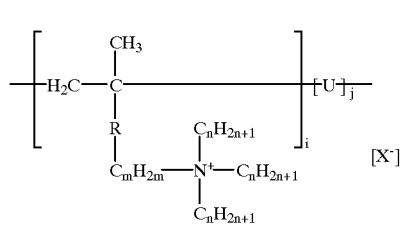

(B)

wherein:

U is a polymer constitutive unit from a copolymerized vinyl comonomer;

R is chosen from a direct bond, —C(O)O— and —C(O)NH—;

m is an integer from 1 to 3;

n is an integer from 1 to 4;

$X^-$ is a counter anion;

i is an integer greater than 4; and j is an integer greater than 4.

20. A polymer-based electrolyte composition according to claim 19, wherein $X^-$ is chosen from $Cl^-$, $Br^-$ and $I^-$.

* * * * *